3/24/87 OR 4,652,723

United States Patent [19]

Salinier et al.

[11] Patent Number: 4,652,723

[45] Date of Patent: Mar. 24, 1987

[54] METHOD FOR HEAT TREATING WITH A MICROWAVE PLASMA TORCH

[75] Inventors: Guy Salinier, Paris; Jean-Paul Bossard, Fontenay-le-Fleury, both of France

[73] Assignee: L'Air Liquide, Societe Anonyme Pour L'Etude et L'Exploitation des Procedes Georges Claude, Paris, France

[21] Appl. No.: 668,165

[22] Filed: Nov. 1, 1984

[30] Foreign Application Priority Data

Nov. 17, 1983 [FR] France ................................ 83 18266

[51] Int. Cl.$^4$ ................................................ B23K 15/00

[52] U.S. Cl. ........................ 219/121 PY; 219/121 PR; 219/121 PM; 219/121 PQ

[58] Field of Search ...... 219/121 P, 121 PM, 121 PC, 219/121 PR, 121 PQ; 427/34; 313/231.31, 231.41, 231.51; 315/111.21

[56] References Cited

U.S. PATENT DOCUMENTS 3,353,060 11/1967 Yamamoto et al. .......... 219/121 PR
3,534,388 10/1970 Ito et al. .......................... 219/121 P

FOREIGN PATENT DOCUMENTS 2153080 4/1973 France .
2160643 6/1973 France .
2389297 11/1978 France .
1214140 12/1970 United Kingdom .

*Primary Examiner*—M. H. Paschall
*Attorney, Agent, or Firm*—Young & Thompson

[57] ABSTRACT

A heat treating method in which a microwave plasma torch is used, comprising an outlet nozzle and a sleeve surrounding and spaced from the nozzle. The nozzle has a central passage surrounded by a generally annular passage formed preferably by a series of conduits arranged in a ring around the central passage. A plasmagenic gas is supplied to the central passage and a combustible gas to the annular passage, while microwave energy is supplied between the sleeve and the nozzle, thereby to form a central plasma jet sheathed by a flame of the burning combustible gas having a generally annular shape. The resulting plasma jet sheathed by a flame is much more stable and much longer, with a much more distinct contour, than in the absence of the flame. The plasma is stable both in the free atmosphere and when it is directed onto an object such as a metal plate. The heat transferred by the plasma sheathed by flame exceeds the sum of the quantities of heat transferred by the nonsheathed plasma alone and by the annular flame alone.

1 Claim, 3 Drawing Figures

METHOD FOR HEAT TREATING WITH A MICROWAVE PLASMA TORCH

The present invention relates to a method for heat treating with a microwave plasma torch. It is in particular applicable to the heat treating of surfaces, to certain chemical reactions, etc.

An object of the invention is to provide a method whereby it is possible to obtain a plasma jet having a flame of great length and high thermal transfer properties and whose power may be distinctly higher than those usually obtained with microwave plasma torches.

For this purpose the invention provides a method for heat treating with a microwave plasma torch, wherein there is created a plasma jet and, around said jet, a flame having a generally annular shape.

Examples of carrying out the invention will now be described with reference to the accompanying drawings in which.

Figures 1, 3:
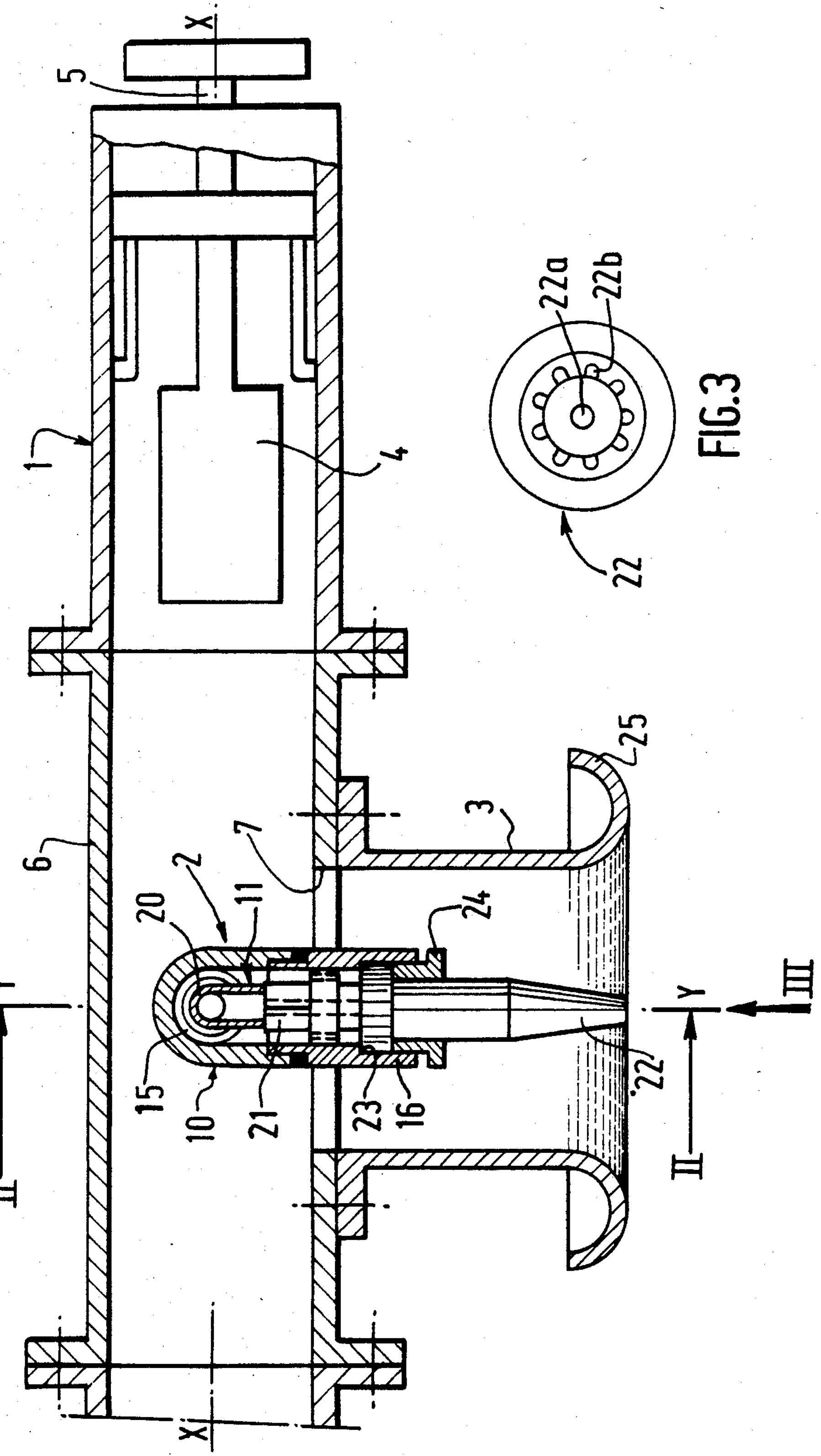
FIG. 1 is a sectional view of a microwave plasma torch whereby it is possible to carry out the method according to the invention, this view being taken along the line I—I of FIG. 2.
FIG. 3 is a partial view in the direction of arrow III of FIG. 1.

The microwave plasma torch shown in the drawings is described in the French patent application No. 83 15 713. It mainly comprises a waveguide 1, a gas supply tube 2 and a sleeve 3, all these elements being of metal.

Figure 2:
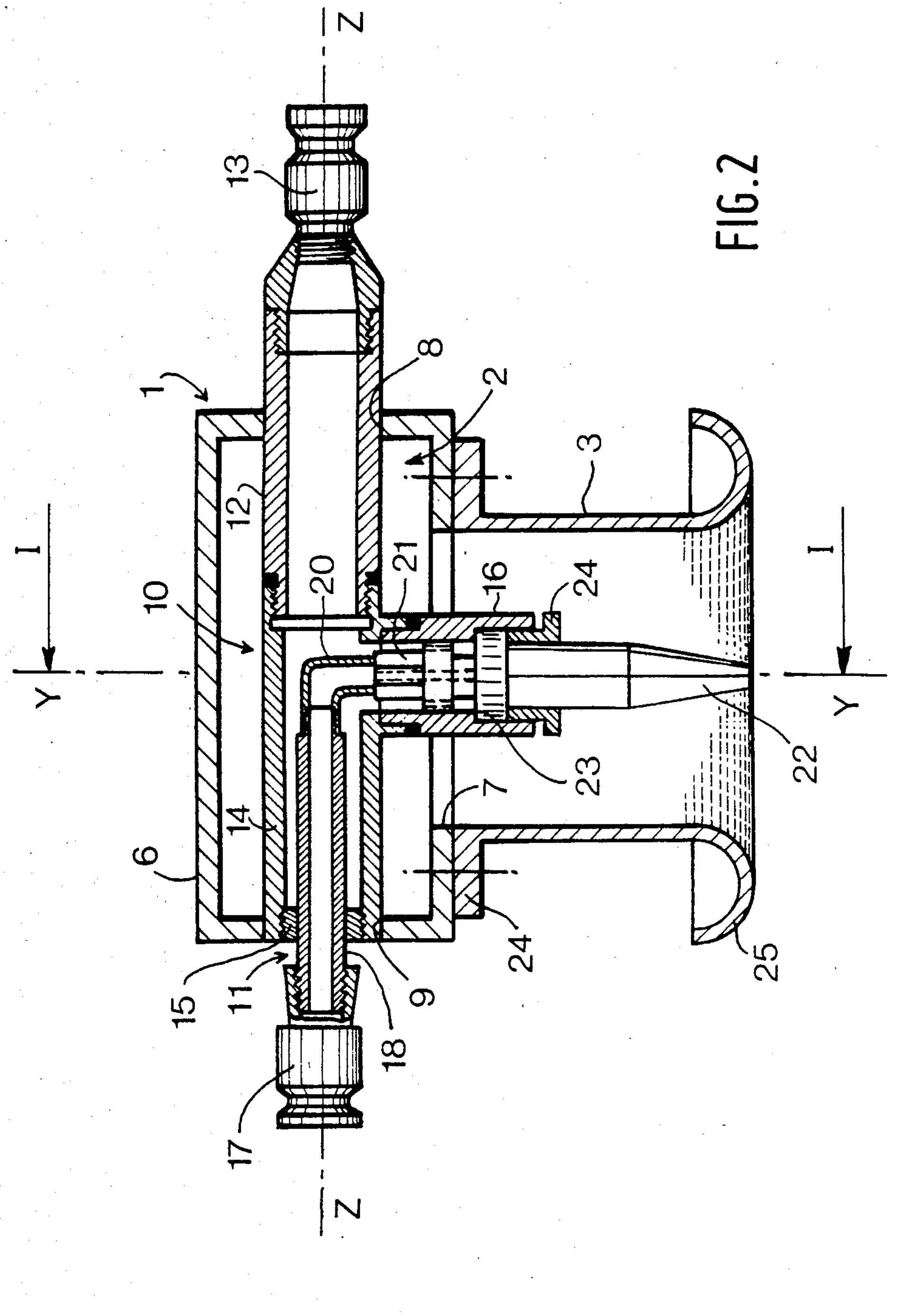
FIG. 2 is a sectional view taken along line II—II of FIG. 1.

The waveguide 1 is rectilinear and has a rectangular section as shown in FIG. 2. It extends from a microwave generator (not shown) located on the left as viewed in FIG. 1, to an end closed by a quarter-wave-trap 4 which is adjustable in position by a slidable rod 5 which projects beyond the end of the waveguide. Such traps are known in the hyperfrequency art and need not be described in detail. For convenience of description, it will be assumed that the axis X—X of the waveguide and the large sides of the rectangular section of this waveguide are horizontal.

The waveguide 1 comprises a detachable intermediate section 6 whose lower side has a circular opening 7 having a vertical axis Y—Y and whose lateral sides have respectively two circular orifices 8 and 9. The orifices 8 and 9 have the same diameter which is smaller than that of the opening 7 and are aligned on a common horizontal axis Z—Z. The axes X—X, Y—Y and Z—Z intersect at the centre of the section of the waveguide located in the plane of symmetry of the section 6.

The supply tube 2 is adapted to convey two different gases respectively through an outer conduit 10 and through an inner conduit 11.

The outer conduit 10 has a generally T shape. An upper branch 12 of the T, having the axis Z—Z, extends through the orifice 8 in a sealed manner and terminates in a coupling 13 adapted to be connected to a source (not shown) of a first gas. The other upper branch 14 of the T, which also has the axis Z—Z, is fitted at its end in the orifice 9 in a sealed manner and is hermetically closed by a washer 15. THe stem 16 of the T extends coaxially through the opening 7 with a large clearance.

The inner conduit 11 is provided with a coupling 17 for connecting it to a source (not shown) of a second gas and comprises an upstream part 18 which has the axis Z—Z and extends through the washer 15 in a sealed manner, an elbow 20 and a downstream part 21 having the axis Y—Y. The part 21 has a flange which is axially perforated so as to permit the centering of the part 21 in the stem 16 of the T and the passage of the first gas.

The whole of the tube 2 may, as shown, be formed by a succession of tubular elements screwed together, the seals being preferably formed by welds. Screwed on the lower end of the stem 16 is a nozzle 22 having a conical nose of a type conventional in oxygen cutting and whose central conduit **22*a* communicates with the conduit 11 and whose annular conduit (or a series of conduits 22*b* arranged in a ring arrangement as shown in FIG. 3) communicates with the conduit 10. The nozzle 22 bears against an inner shoulder 23 of the conduit 10, with interposition of a suitable sealing element (not shown), and is held in position by a nut 24** screwed in this conduit.

The sleeve 3 has an inside diameter substantially equal to that of the opening 7. It has at its upper end an outer flange 24 screwed in position around this opening and, at its lower end, a formed-over or rolled outer wing or flange 25. This wing, which is connected tangentially to the cylindrical wall of the sleeve, may have, as shown, a contour in the shape of an arc of a circle. As a modification, this wing 25 may be replaced by an outer beading having a rounded contour and tangentially connected to the sleeve. The lowermost circle of the wing 25 or beading is substantially contained in the horizontal end plane of the nozzle 22.

In operation, the coupling 17 is connected to a source of a plasmagenic gas, and the coupling 13 is connected to a source of a gas or a gaseous mixture adapted to form at the outlet of the nozzle 22 a flame having a generally annular shape surrounding the central jet.

The microwave generator delivers a pulsating electromagnetic energy, for example at the frequency 2.45 GHz.

The incident power is divided into a useful power transmitted through the tube 2 and the nozzle 22, which forms an antenna in the absence of gas, and a parasitic reflected power sent back by the waveguide 1 to the generator.

With an incident power which may be as much as at least 6 kW, the useful power, which is on the order of 95% of the incident power provided the trap 4 has been correctly adjusted, forms a central plasma jet, after priming achieved for example by creating a temporary short-circuit between the nozzle 22 and the sleeve 3. This plasma ignites the gas or the gaseous mixture issuing from the conduits **22*b*** so that the plasma jet is sheathed by an annular or substantially annular flame.

The applicant has found that, surprisingly, such a plasma jet sheathed by a flame is much more stable and much longer, with a much more distinct contour, than in the absence of the flame. The plasma is stable both in the free atmosphere and when it is directed onto an object, in particular onto a metal plate.

If a plasma sheathed by a flame is compared with a plasma sheathed by a simple annular stream of gas issuing from the conduits **22*b***, it is found, in the first case and for a given power, that:

the central and annular gas flows required to ensure the stability of the plasma are greatly reduced;

the thermal transfer, i.e. the quantity of heat which may be recovered, is highly increased. More particularly, the sheathing of the plasma by an annular stream of non-combustible gas increases the time to cut a given metal part, whereas the sheathing by means of a flame reduces this cutting time. Further, a synergic effect is observed between the plasma and the flame, i.e. both as concerns the overall thermal transfer and as concerns the local thermal transfer (heat which may be recovered in a limited zone), the heat transferred by the plasma sheathed by a flame exceeds the sum of the quantities of heat transferred, on one hand, by the non-sheathed plasma and, on the other hand, by the annular flame alone under the same conditions of power and flows.

Conclusive tests have been carried out by the applicant with very many couples of gas and in particular:

for the plasmagenic central gas: oxygen, nitrogen, nitrogen oxide, the rare gases of the air and their mixtures, air, and mixtures of argon or helium with a proportion of hydrogen or $CO_2$ ranging up to about 60%;

for the annular gas: combustible gases such as hydrogen, hydrocarbons and hydrocarbon mixtures alone, or mixed with oxygen.

It should be noted that only the sheathing by a flame permits, with a microwave torch, the obtention under acceptable conditions of plasmas of oxygen or of mixtures having a high content of hydrogen or of $CO_2$, which opens the way to a wide range of industrial applications employing the properties of these gases.

What is claimed is:

1. A heat treating method comprising:

providing a microwave plasma torch comprising an outlet nozzle and a sleeve surrounding and spaced from the nozzle, said nozzle comprising a central passage surrounded by a generally annular passage;

supplying said central passage with a plasma-genic gas comprising a mixture of a gas selected from nitrogen, rare gases of air and mixtures thereof and mixtures of argon or helium with up to about 60% $C_2$;

supplying said generally annular passage with a combustible $H_2/O_2$ mixture containing a substantial proportion of each of $H_2$ and $O_2$; and supplying the torch with microwave energy between the sleeve and the nozzle, thereby to form a central plasma jet sheathed by a flame of the burning said combustible gas mixture having a generally annular shape.

* * * * *